(12) United States Patent
Madabhushi et al.

(10) Patent No.: US 10,769,783 B2
(45) Date of Patent: Sep. 8, 2020

(54) PREDICTING PROSTATE CANCER BIOCHEMICAL RECURRENCE USING COMBINED NUCLEAR NF-KB/P65 LOCALIZATION AND GLAND MORPHOLOGY

(71) Applicant: Case Western Reserve University, Cleveland, OH (US)

(72) Inventors: Anant Madabhushi, Shaker Heights, OH (US); Patrick Leo, Honoeye Falls, NY (US); Andrew Janowczyk, East Meadow, NY (US); Sanjay Gupta, Mayfield Heights, OH (US)

(73) Assignee: Case Western Reserve University, Cleveland, OH (US)

( * ) Notice: Subject to any disclaimer, the term of this patent is extended or adjusted under 35 U.S.C. 154(b) by 62 days.

(21) Appl. No.: 16/217,274

(22) Filed: Dec. 12, 2018

(65) Prior Publication Data

US 2019/0251687 A1 Aug. 15, 2019

Related U.S. Application Data

(60) Provisional application No. 62/628,533, filed on Feb. 9, 2018.

(51) Int. Cl.
*G06T 7/00* (2017.01)
*G06K 9/62* (2006.01)
*G06K 9/00* (2006.01)

(52) U.S. Cl.
CPC .......... *G06T 7/0012* (2013.01); *G06K 9/0014* (2013.01); *G06K 9/6202* (2013.01);
(Continued)

(58) Field of Classification Search
CPC ......... G06T 7/0012; G06T 2207/20036; G06T 2207/20081; G06T 2207/30024;
(Continued)

(56) References Cited

U.S. PATENT DOCUMENTS

2012/0041274 A1\* 2/2012 Stone ..................... G16B 20/00
600/300
2013/0323739 A1\* 12/2013 Klem ................. G01N 33/5091
435/6.12

(Continued)

*Primary Examiner* — Bobbak Safaipour
(74) *Attorney, Agent, or Firm* — Eschweiler & Potashnik, LLC

(57) ABSTRACT

Embodiments include controlling a processor to perform operations for predicting biochemical recurrence (BCR) in prostate cancer (PCa), including accessing a first digitized pathology slide having a first stain channel of a region of tissue demonstrating PCa; accessing a second digitized pathology slide having a second, different stain channel of the region of tissue; extracting morphology features from the first stain channel; extracting stain intensity features from the second stain channel, where a stain intensity feature quantifies an amount of a molecular biomarker present in a cellular nucleus; controlling a first machine learning classifier to generate a first probability of BCR based on the morphology features; controlling a second machine learning classifier to generate a second, different probability of BCR based on the stain intensity features; computing an aggregate probability of BCR based on the first probability and the second probability; and displaying the aggregate probability.

20 Claims, 7 Drawing Sheets

(52) U.S. Cl.
CPC ......... *G06K 9/6223* (2013.01); *G06K 9/6277* (2013.01); *G06T 2207/20036* (2013.01); *G06T 2207/20081* (2013.01); *G06T 2207/30024* (2013.01)

(58) Field of Classification Search
CPC ........ G06T 2207/30081; G06K 9/6277; G06K 9/6223; G06K 9/6202; G06K 9/0014
See application file for complete search history.

(56) References Cited

U.S. PATENT DOCUMENTS

| | | | |
|---|---|---|---|
| 2016/0333420 A1* | 11/2016 | Stern | C12Q 1/6886 |
| 2016/0376666 A1* | 12/2016 | Luo | C12Q 1/6886 |
| | | | 514/44 A |
| 2017/0204466 A1* | 7/2017 | Lu | A61K 9/06 |
| 2019/0286790 A1* | 9/2019 | Kaigala | G16H 50/30 |

* cited by examiner

PREDICTING PROSTATE CANCER BIOCHEMICAL RECURRENCE USING COMBINED NUCLEAR NF-KB/P65 LOCALIZATION AND GLAND MORPHOLOGY

CROSS REFERENCE TO RELATED APPLICATIONS

This application claims the benefit of U.S. Provisional Application 62/628,533 filed Feb. 9, 2018, which is incorporated by reference herein in its entirety.

FEDERAL FUNDING NOTICE

This invention was made with government support under grants W81XWH-15-1-0558 awarded by the Department of Defense, and R01CA108512 awarded by the National Institutes of Health. The government has certain rights in the invention.

BACKGROUND

Following radical prostatectomy, there is a risk that a prostate cancer (PCa) patient may experience early biochemical recurrence (BCR). Determining which patients are likely to experience early BCR facilitates the direction of additional resources and treatments to those patients more likely to experience early BCR, while sparing lower risk patients unneeded treatment. Existing approaches to predicting early BCR rely on age, prostate specific antigen (PSA) levels, and the results of a tissue evaluation performed by a human pathologist. The pathologist's diagnosis is ultimately based on a subjective examination and has limited accuracy and reproducibility. Existing approaches thus suffer from low accuracy, intra-observer variability, as well as inter-observer variability, and are sub-optimal.

BRIEF DESCRIPTION OF THE DRAWINGS

The accompanying drawings, which are incorporated in and constitute a part of the specification, illustrate various example operations, apparatus, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that, in some examples, one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
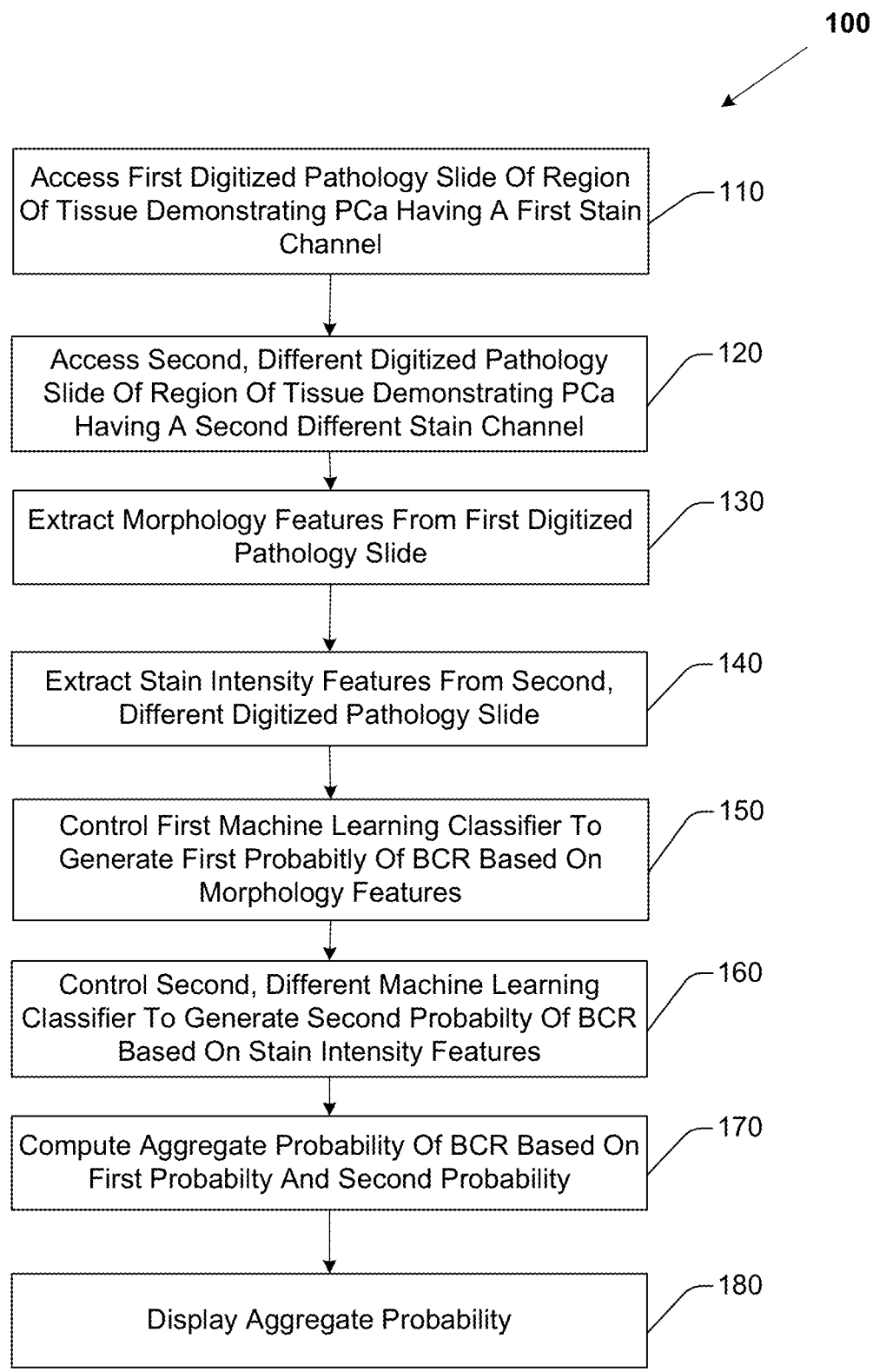
FIG. 1 is a flow diagram of example operations for predicting BCR in PCa patients.

Following radical prostatectomy there is a risk that a PCa patient may experience early BCR. Determining which PCa patients are likely to have recurrence facilitates the direction of additional resources or aggressive treatment to those patients, while sparing lower risk patients unneeded treatment. Existing approaches for predicting BCR rely on the patient's age, PSA levels, and the results of tissue evaluations performed by a human pathologist. The pathologist's diagnosis is based on a subjective examination, and has limited accuracy and reproducibility due to the limits of human perception, intra-observer variability, and intra-observer variability. Thus there is an unmet need for an objective, reproducible, and accurate approach for predicting BCR in PCa patients.

Embodiments include apparatus, circuits, methods, operations, systems and other embodiments that quantify the extent of the biomarker NF-kB/p65 staining in cellular nuclei represented in digitized pathology slides of a region of tissue demonstrating PCa. Embodiments extract optical density features from cellular nuclei represented in a digitized image stained with 3,3-Diaminobenzidine (DAB) stain. Embodiments derive features from the percentages of pixels or nuclei that are negative, weakly positive, moderately positive, or strongly positive for NF-kB/p65 staining. Embodiments further extract morphological features from another digitized pathology slide of the region of tissue. The morphological features may include measures of gland shape, gland arrangement, and gland disorder, as well as textural descriptors of the digitized pathology slide. Embodiments provide the morphological features to a machine learning classifier to compute a probability of BCR. Embodiments further provide the features derived from the optical density features to a machine learning classifier to compute a second probability of BCR. Embodiments compute an aggregate probability of BCR as a function of the first probability and the second probability with an accuracy of at least 0.87. Embodiments may train the machine learning classifier.

Embodiments may select the most discriminatory morphological features and optical density features from a training set of patients. In one embodiment, two pathology slices per patient were obtained from twenty-three (23) radical prostatectomy samples, of which eight (8) were obtained from patients who experienced early recurrence. Early recurrence is defined as a PSA level greater than 0.2 ng/nl within two years of surgery. A first of the two pathology slices per patient was stained with hematoxylin and eosin (H&E) and a second of the two pathology slices was stained for NF-kB/p65 using 3,3-Diaminobenzidine (DAB), respectively. The two pathology slices per patient were mounted on slides, and digitized at 40× magnification. An expert pathologist annotated the images for a representative cancerous region. In another embodiment, automated annotation techniques may be employed.

Embodiments segment gland lumens represented in the H&E stained digitized pathology slices, and extract radiomic features from the segmented gland lumens. In one embodiment, glands are segmented by randomly selecting ten-thousand (10,000) pixels from an H&E stained digitized pathology slide, and performing k-means clustering in red-green-blue (RGB) space with k=4. The clusters are labeled as one of four categories: stroma, cytoplasm, nuclei, or lumen. In one embodiment, every pixel in the image is classified according to the cluster it is nearest to in the RGB space, according to Euclidean distance. Embodiments then identify connected objects of lumen pixels. The edges of such lumen objects are smoothed by a Gaussian filter and stored as segmented lumen objects.

In this embodiment, gland lumen features are extracted from the segmented lumen objects represented in the H&E stained digitized pathology slide. In one embodiment, two-hundred and sixteen (216) gland lumen features are extracted. Twenty-six (26) Haralick texture features are extracted from pixel intensity values in the entire image, excluding background pixels outside the tissue which are identified by applying a pixel intensity threshold. A Haralick feature may include a pixel intensity contrast feature, an energy feature, or an entropy feature. Haralick features capture textural patterns and are predictive of variation in tumor microarchitecture, heterogeneity, and the local appearance of cancerous tissue. In this embodiment, fifty-one (51) global graph features are extracted. Global graph features may include a gland arrangement feature, a density feature, or a Voronoi or Delaunay map feature. In this embodiment, one-hundred (100) shape features are extracted. Shape features may include a gland shape feature, a perimeter feature, a Fourier discriminator feature, or an invariant moment descriptor feature. In this embodiment, thirty-nine (39) disorder2 features are extracted. A disorder2 feature may include a gland orientation disorder feature. In this embodiment, twenty-six sub-graph features are extracted. Sub-graph features may include a gland local graph arrangement feature, a cluster feature, or a graph edge feature. In other embodiments, other different, radiomic features may be extracted from the H&E stained digitized pathology slide. For example, co-occurrence of local anisotropic gland orientation entropy (CoLIAGe) features that capture textural entropy structural disorder by applying gray level co-occurrence matrix (GLCM) metrics of disorder to local dominant intensity gradients may be extracted. Laws features and Laplace features that are filter-based descriptors that capture textural patterns, or Gabor features that capture spatial frequencies within the image at directional orientations, may also be extracted.

Embodiments segment cellular nuclei represented in the DAB stained NF-kB/p65 digitized pathology slides, and extract optical density features from the segmented nuclei. The biomarker NF-kB/p65 is associated with cancer onset and metastasis, through regulation of cell growth, differentiation, and apoptosis. Embodiments quantify the amount of NF-kB/p65 in cellular nuclei and generate a prediction of BCR based, in part, on the amount of NF-kB/p65 in cellular nuclei. In one embodiment, cellular nuclei are segmented from the cancerous region of a NF-kB/p65 digitized pathology slide using a deep learning nuclei segmentation approach. In this embodiment, a 65 pixel by 65 pixel network is employed, providing greater accuracy in nucleus detection compared to existing 32 pixel by 32 pixel patch size approaches. In another embodiment, other patch sizes or segmentation approaches may be employed. For example, other automated segmentation techniques may be employed to segment nuclei, including a region growing technique, thresholding, or a watershed approach. Embodiments may generate a nuclei mask based on the segmented cellular nuclei.

Embodiments isolate the DAB stain channel in the NF-kB/p65 digitized pathology slide. In one embodiment, color deconvolution is performed on nuclei pixels in the NF-kB/p65 digitized pathology slide to isolate the DAB stain channel. In one embodiment, a non-linear mapping approach to stain normalization is employed. In other embodiments, other color deconvolution approaches may be employed. Embodiments may generate a stain intensity map based on the color deconvolution.

Embodiments assign pixels in the NF-kB/p65 digitized pathology slide a label according to their stain intensity. In this embodiment, a pixel may be labeled as negative, weakly positive, moderately positive, or strongly positive, according to its stain intensity. Threshold values for scoring may be chosen based on a qualitative examination of the NF-kB/p65 digitized pathology slide, where a threshold value is selected to appropriately score sampled pixels. In one embodiment, the threshold values are, in an 8 bit stain intensity image with a maximum value of 255, 20 for weakly positive, 40 for moderately positive, and 75 for strongly positive. In another embodiment, pixels may be labeled according to other categories, other threshold values may be employed, or other numbers of categories may be employed.

In this embodiment, the first four NF-kB/p65 features include the number of pixels in each staining category (e.g., negative, weakly positive, moderately positive, or strongly positive), converted to a percentage of all nuclei pixels represented in the NF-kB/p65 digitized pathology slide. Embodiments may compute twenty-two (22) other NF-kB/p65 features, which include ratios and sums of the first four NF-kB/p65 features. Other NF-kB/p65 features may be generated as a function of the first four NF-kB/p65 features. Embodiments combine the nuclei mask and the stain intensity map to label nuclei according to the stain score of the plurality of their pixels. Embodiments may then extract the same twenty-six (26) features on a per-nucleus basis, rather than a per-pixel basis, from the NF-kB/p65 digitized pathology slide. Thus, embodiments extract both pixel-level and nucleus-level features. The pixel-level metrics extracted by embodiments are beyond the limits of human perception.

Figure 3:
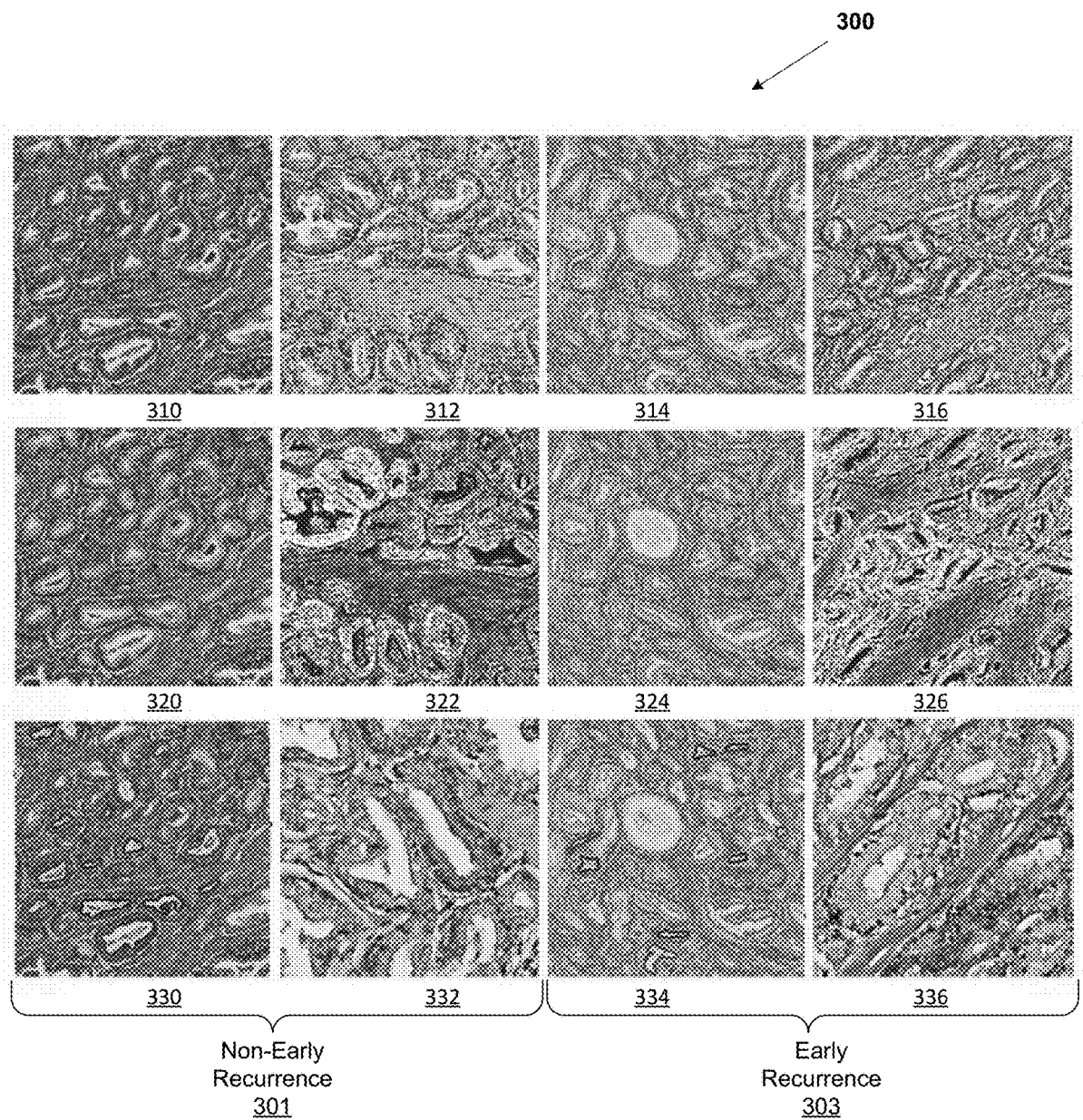
FIG. 3 illustrates sample regions of interest and feature visualizations from non-early recurrence and early recurrence PCa patients.

FIG. 3 illustrates a set 300 of sample regions of interest and feature visualizations of digitized pathology slides of non-early recurrence and early recurrence PCa patients. Non-early recurrence images are illustrated in column 301, and early recurrence images are illustrated in column 303. RGB images from H&E stained digitized pathology slides are illustrated at 310 and 314, and NF-kB/p65 stained images are illustrated at 312 and 316. Glands segmented using automated gland segmentation techniques are illustrated at 320 and 324. Results of color deconvolution are illustrated at 322 and 326. Brighter pixels have a higher optical density of DAB, indicating the presence of more NF-kB/p65.

In FIG. 3, gland orientation disorder maps are illustrated at 330 and 334. Glands are colored according to their orientation direction, which is also indicated by an arrow on each gland, respectively. Glands from the non-early recurrence region of interest illustrated at 330 are almost all uniformly oriented in the northeast direction, while those in the early recurrence region at 334 display a higher degree of orientation disorder.

Nuclei segmentation overlaid on the NF-kB/p65 stain intensity map showing the calculated stain intensity of each nuclei is illustrated at 332 and 336. Almost all nuclei in the non-early recurrence region illustrated at 332 are negative, while there are many positive nuclei in the early-recurrence region illustrated at 336, including several which are strongly positive.

Embodiments may select features that are most prognostic of BCR recurrence. In one embodiment, leave-one-out validation is employed to select the most prognostic features.

For example, a machine learning classifier trained on and using only features extracted from H&E stained digitized pathology slides, the most frequently selected (i.e., most prognostic) features include a gland orientation disorder average feature, a gland orientation disorder information measure 2 feature, and a gland orientation disorder energy range feature. This classifier achieves an accuracy of 0.78, a sensitivity of 0.88, and a specificity of 0.73. In another example, a machine learning classifier trained on and employing features extracted from digitized pathology slides stained for NF-kB/p65, the most frequently selected features include a percent pixels negative feature, a ratio of the number of moderately positive pixels to the number of strongly positive pixels feature, and a ratio of the number of weakly positive pixels to the number of strongly positive pixels feature. This classifier achieves an accuracy of 0.74, a sensitivity of 0.38, and a specificity of 0.93. In contrast, embodiments described herein that combine morphological features with NF-kB/p65 features achieve an accuracy of at least 0.87, a sensitivity of 0.68, and a specificity of 1.00.

Embodiments that combine morphological features with molecular biomarkers provide improved performance with respect to disease recurrence prognostic accuracy, compared to existing approaches and existing clinical variables. Existing approaches that characterize PCa and predict BCR using just features extracted from H&E stained digitized pathology slides achieve an accuracy of 78%, which is comparable to the Kattan-Stephenson monogram, which is the current BCR prediction and gold standard, which has a concordance index of 0.78 to 0.81. Existing approaches that use co-occurring gland angularity in localized subgraphs to predict BCR have a five-year BCR prediction accuracy of 73%. With respect to digitized pathology slides stained for NF-kB/p65, moderately positive or weakly positive nuclei are among the most prognostic features for predicting BCR. However, existing approaches to predicting BCR based on counting moderately and weakly positive nuclei suffer from high inter-observer variability. Thus, embodiments improve on existing approaches to predicting BCR by improving the reproducibility of predictions based on features extracted from H&E stained imagery, and by improving the accuracy of predictions based on NF-kB/p65 scoring, and further by combining channel-specific information of gland morphology and NF-kB/p65 localization to predict BCR with greater accuracy. Embodiments thus improve the performance, including at least the accuracy of circuits, systems, apparatus, and computers that predict BCR in PCa.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, calculating, determining, and so on, refer to actions and processes of a computer system, logic, circuit, processor, or similar electronic device that manipulates and transforms data represented as physical (electronic) quantities.

Example methods and operations may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

FIG. 1 is a flow diagram of example operations 100 that may be performed by a processor for predicting early BCR in PCa patients. A processor(s) may include any combination of general-purpose processors and dedicated processors (e.g., graphics processors, application processors, etc.). The processors may be coupled with or may include memory or storage and may be configured to execute instructions stored in the memory or storage to enable various apparatus, applications, or operating systems to perform the operations. The memory or storage devices may include main memory, disk storage, or any suitable combination thereof. The memory or storage devices may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, or solid-state storage.

The set of operations 100 includes, at 110, accessing a first digitized pathology slide of a region of tissue demonstrating PCa. The region of tissue includes cellular nuclei. Accessing the first digitized pathology slide includes acquiring electronic data, reading from a computer file, receiving a computer file, reading from a computer memory, or other computerized activity. The first digitized pathology slide has a plurality of pixels, a pixel having an intensity. The first digitized pathology slide has a first stain channel. In one embodiment, the first digitized pathology slide is a digitized image of a first histology slice of a region of tissue demonstrating PCa, where the first histology slice is a hematoxylin and eosin (H&E) stained histology slice. In another embodiment, other stain types may be employed.

The set of operations 100 also includes, at 120, accessing a second, different digitized pathology slide of the region of tissue. The second digitized pathology slide has a second, different stain channel. Accessing the second digitized pathology slide includes acquiring electronic data, reading from a computer file, receiving a computer file, reading from a computer memory, or other computerized activity. The second digitized pathology slide has a plurality of pixels, a pixel having an intensity. In one embodiment, the second, different digitized pathology slide is a digitized image of a second histology slice stained using 3,3-Diaminobenzidine (DAB).

The set of operations 100 also includes, at 130, extracting a set of morphology features from the first stain channel of the first digitized pathology slide. Morphology features, including features that express gland arrangement, shape, or image texture, may be sub-visual features that are imperceptible to the human eye.

Figure 2:
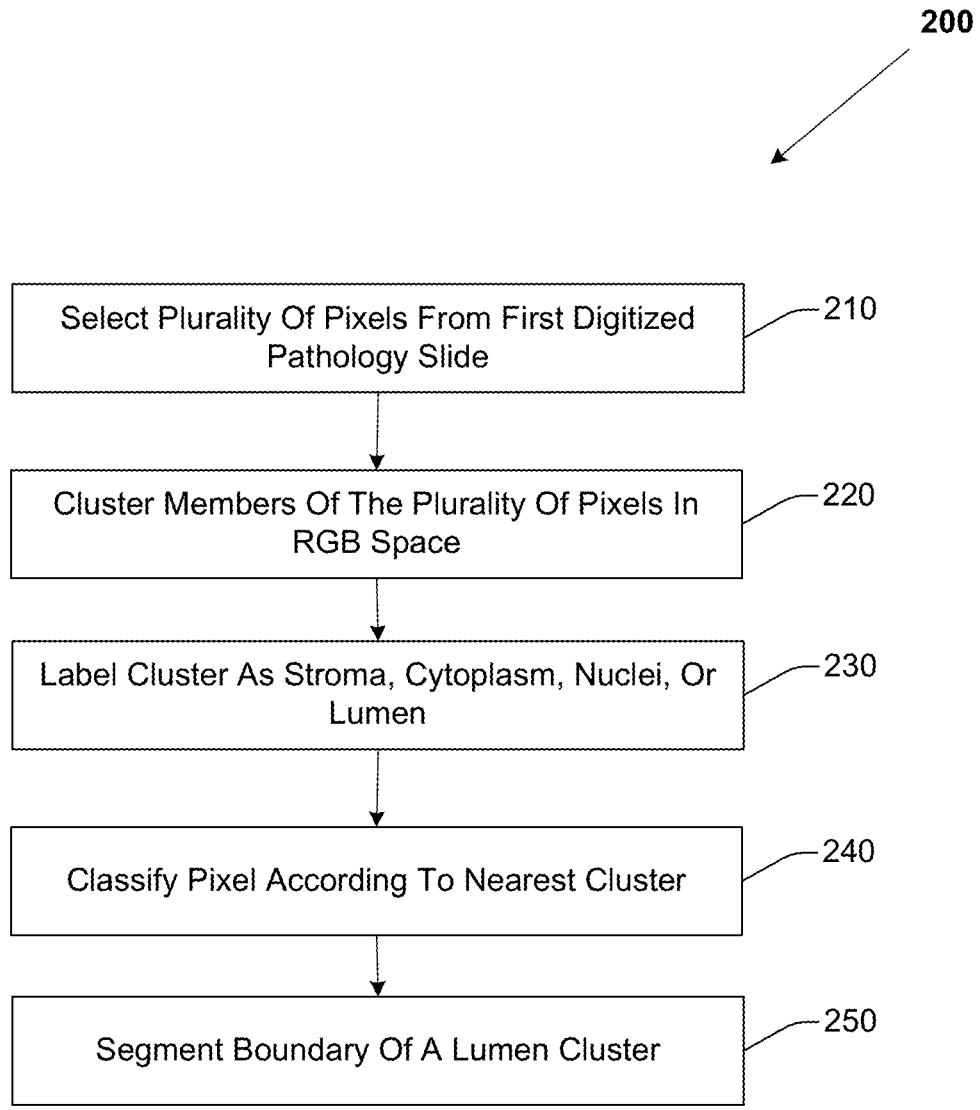
FIG. 2 is a flow diagram of example operations for predicting BCR in PCa patients.

FIG. 2 illustrates a set of operations 200 for extracting the set of morphology images from the first stain channel of the first digitized pathology slide. The set of operations 200 includes, at 210, selecting a plurality of pixels in the first digitized pathology slide. Selecting the plurality of pixels may include selecting every other pixel in the first digitized pathology slide. In another embodiment, selecting the plurality of pixels may include selecting a threshold number of pixels (e.g., 33%, 66%) in the first digitized pathology slide, or selecting a number of pixels according to a desired use of computational resources.

The set of operations 200 also includes, at 220, clustering members of the plurality of pixels in red-green-blue (RGB) space. In one embodiment, members of the plurality of pixels are clustered in RGB space using k-means clustering, where k=4. In another embodiment, other values of k may be employed, or other color spaces may be employed.

The set of operations 200 also includes, at 230, labeling a cluster as stroma, cytoplasm, nuclei, or lumen. In another embodiment, other labels or other numbers of labels may be employed. For example, in a two-label scheme, a cluster may be labeled as lumen or non-lumen.

The set of operations 200 also includes, at 240, classifying a pixel according to the cluster nearest to the pixel. In one embodiment, pixel classification according to the nearest cluster includes calculating the Euclidean distance in the RGB space between a pixel and the center of a cluster. The cluster that has the shortest distance to the pixel is the cluster the pixel is classified as belonging to.

The set of operations 200 further includes, at 250, segmenting a boundary of a lumen cluster. In one embodiment, segmenting the boundary of a lumen cluster includes identifying connected objects of lumen pixels, smoothing those objects with a Gaussian kernel, and then applying an edge detection kernel to find the boundary of the lumen object.

In one embodiment, the set of morphology features includes a gland orientation disorder average range feature, a gland orientation disorder information measure 2 feature, and a gland orientation disorder energy range feature. In another embodiment, the set of morphology features includes at least one gland lumen feature and at least one Haralick feature. In this embodiment, the at least one gland lumen features includes a global graph feature, a shape feature, a disorder feature, or a sub-graph feature, and the at least one Haralick feature includes a pixel intensity contrast feature, an energy feature, or an entropy feature.

Returning to FIG. 1, the set of operations 100 also includes, at 140, extracting a set of stain intensity features from the second, different stain channel of the second, different digitized pathology slide. A stain intensity feature quantifies an amount of a molecular biomarker present in a cellular nucleus represented in the second, different digitized pathology slide. In one embodiment, the molecular biomarker is NF-kB/p65.

In one embodiment, extracting the set of stain intensity features includes segmenting a cellular nucleus represented in the second different digitized pathology slide. Segmenting the cellular nucleus represented in the second different digitized pathology slide may include segmenting the cellular nucleus using a deep learning segmentation approach that employs a 65 pixel by 65 pixel patch. In another embodiment, other segmentation approaches may be employed including watershed segmentation, deep learning methods using an alternative network design, or color deconvolution to isolate regions hyper-intense for nuclei-selective stains. Extracting the set of stain intensity features further includes computing an optical density of the DAB stain in a pixel of a segmented cellular nucleus.

In one embodiment, the set of stain intensity features includes a percentage of cellular nuclei pixels that have a negative DAB stain optical intensity. The set of stain intensity features also includes a ratio of the number of cellular nuclei pixels having a moderately positive DAB stain optical intensity to the number of cellular nuclei pixels having a strongly positive DAB stain optical intensity. In this embodiment, the set of stain intensity features further includes a ratio of the number of cellular nuclei pixels having a weakly positive DAB stain optical intensity to the number of cellular nuclei pixels having a strongly positive DAB stain optical intensity.

The set of operations 100 also includes, at 150, controlling a first machine learning classifier to generate a first probability of BCR based on the set of morphology features. In one embodiment, the first probability exists in the range [0, 1]. Controlling the first machine learning classifier to generate the first probability may include providing the set of morphology features to the first machine learning classifier, and receiving the first probability from the first machine learning classifier. The first machine learning classifier may be, in one embodiment, a naïve-Bayes classifier, a linear discriminant analysis (LDA) classifier, a quadratic discriminant analysis (QDA) classifier, a support vector machine, or a random forest classifier.

The set of operations 100 also includes, at 160, controlling a second, different machine learning classifier to generate a second, different probability of BCR. In one embodiment, the second probability exists in the range [0, 1]. The second different machine learning classifier generates the second probability based on the set of stain intensity features. Controlling the second machine learning classifier to generate the second probability may include providing the set of stain intensity features to the second machine learning classifier, and receiving the second probability from the second different machine learning classifier.

The set of operations 100 also includes, at 170, computing an aggregate probability of BCR. Embodiments compute the aggregate probability of BCR as a function of the first probability and the second, different probability. In one embodiment, computing the aggregate probability includes multiplying the first probability with the second probability. In another embodiment, the aggregate probability may be computed using another, different function of the first probability and the second, different probability. For example, one probability may be weighted higher than the other, the probabilities may be combined in a non-linear manner, or the maximum or minimum of the two probabilities may be used as the aggregate probability. Computing the aggregate probability includes acquiring electronic data, reading from a computer file, receiving a computer file, reading from a computer memory, or other computerized activity. In embodiments described herein, the aggregate probability predicts BCR with an accuracy of at least 0.87.

The set of operations 100 further includes, at 180, displaying the aggregate probability. Displaying the aggregate probability may include displaying the aggregate probability on a computer monitor, a smartphone display, a tablet display, or other displays. Displaying the aggregate probability may also include printing the aggregate probability. Displaying the aggregate probability may also include controlling a computer assisted diagnosis (CADx) system, a monitor, or other display, to display operating parameters or characteristics of a machine learning classifier, including the first machine learning classifier or the second, different machine learning classifier, during both training and testing, or during clinical operation of the machine learning classifier. By displaying the aggregate probability, example embodiments provide a timely and intuitive way for a human pathologist to more accurately classify pathologies demonstrated by a patient, thus improving on existing approaches to predicting BCR or to generate a personalized PCa treatment plan.

In one embodiment, computing the first probability or the second probability, includes providing the set of morphology features or the set of stain intensity features to a machine learning classifier. In one embodiment, the first machine learning classifier or the second machine learning classifier is configured to discriminate PCa tissue that experiences BCR from PCa tissue that does not experience BCR, and configured to compute a probability in the range [0, 1] that the region of tissue will experience BCR. In embodiments described herein, computing the first probability or the second probability includes receiving from the first machine learning classifier or the second machine learning classifier, the first probability or the second probability, respectively. In one embodiment, the first machine learning classifier or the second machine learning classifier may be, for example, a linear discriminant analysis (LDA) classifier, a quadratic discriminant analysis (QDA) classifier, a support vector machine (SVM) classifier, or may include a convolutional neural network or other deep-learning classifier. In one embodiment, the first machine learning classifier and the second machine learning classifier may be of the same type of machine learning classifier. In another embodiment, the first machine learning classifier and the second machine learning classifier may be of different types of machine learning classifier.

Embodiments may further include generating a personalized PCa treatment plan. The personalized PCa treatment plan is based on the aggregate probability. In another embodiment, the personalized PCa treatment plan is further base on at least one of the first probability, the second probability, the first digitized pathology slide, or the second digitized pathology slide. Generating a personalized treatment plan facilitates the technical effect of delivering a particular treatment that will be therapeutically active to the patient, while minimizing negative or adverse effects experienced by the patient. For example, the personalized treatment plan may suggest a surgical treatment, may define an immunotherapy agent dosage or schedule, or a chemotherapy agent dosage or schedule, when the aggregate probability is high. For a region of tissue where the aggregate probability is low, other treatments may be suggested. Similarly, the personalized treatment plan may suggest a first treatment for a first aggregate probability, and suggest a second, different treatment for a second, different aggregate probability.

In one embodiment, the operations may further include training a machine learning classifier, including the first machine learning classifier or the second machine learning classifier. In this embodiment, the first machine learning classifier or the second machine learning classifier is trained and tested using a training set of images and a testing set of images. The training set of images and the testing set of images include imagery from patients that experienced BCR, and patients that did not experience BCR. Training the machine learning classifier may include training the first machine learning classifier or the second machine learning classifier until a threshold level of accuracy is achieved, until a threshold time has been spent training the machine learning classifier, until a threshold amount of computational resources have been expended training the machine learning classifier, or until a user terminates the training. Other training termination conditions may be employed. Training the first machine learning classifier or the second machine learning classifier may also include determining which morphology features or which stain intensity features are most discriminative in distinguishing tissue likely to experience recurrence from tissue unlikely to experience recurrence.

While FIGS. 1 and 2 illustrate various actions occurring in serial, it is to be appreciated that various actions illustrated in FIGS. 1 and 2 could occur substantially in parallel. By way of illustration, a first process could involve accessing a first digitized pathology slide, a second process could involve extracting morphology features from the first digitized pathology slide, and a third process could involve accessing a second digitized pathology slide. While three processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage device may store computer executable instructions that if executed by a machine (e.g., computer, processor) cause the machine to perform methods or operations described or claimed herein including operations 100 or 200, method 600, or any other methods or operations described herein. While executable instructions associated with the listed methods are described as being stored on a computer-readable storage device, it is to be appreciated that executable instructions associated with other example methods or operations described or claimed herein may also be stored on a computer-readable storage device. In different embodiments the example methods or operations described herein may be triggered in different ways. In one embodiment, a method or operation may be triggered manually by a user. In another example, a method or operation may be triggered automatically.

Improved prediction of BCR may produce the technical effect of improving treatment efficacy by increasing the accuracy of and decreasing the time required to treat patients demonstrating PCa, or other forms of cancerous pathology. Treatments and resources, including expensive immunotherapy agents or chemotherapy may be more accurately tailored to patients with a likelihood of experiencing BCR, so that more appropriate treatment protocols may be employed, and expensive resources are not wasted. Controlling a personalized medicine system, a CADx system, a processor, or a PCa recurrence prognosis system based on improved, more accurate prediction of BCR or classification of tissue further improves the operation of the system, processor, or apparatus, at least because the accuracy of the system, processor, or apparatus is increased, and unnecessary operations will not be performed.

Embodiments described herein, including at least the sets of operations 100 and 200, apparatus 400 and 500, method 600, and computer 700, resolve features extracted from digitized pathology imagery at a higher order or higher level than a human can resolve in the human mind or with pencil and paper. For example, Haralick features are not properties of the tissue that a human eye can perceive. PCa tissue does not include a set of pixels with intensities, graphs, or entropy features, and these features cannot be stored in a human mind. Embodiments described herein use a combined order of specific rules, elements, operations, or components that render information into a specific format that is then used and applied to create desired technical results more accurately, more consistently, and with greater reliability than existing approaches, thereby producing the technical effect of improving the performance of the machine, computer, or system with which embodiments are implemented.

Using a more appropriately modulated treatment may lead to less aggressive therapeutics being required for a patient or may lead to avoiding or delaying a biopsy, a resection, or other invasive procedure. When patients demonstrating PCa who are likely to experience recurrence are more accurately distinguished from patients who are unlikely to experience recurrence, patients most at risk may receive a higher proportion of scarce resources (e.g., therapeutics, physician time and attention, hospital beds) while those less likely to benefit from the treatment, or less in need, may be spared unnecessary treatment, which in turn spares unnecessary expenditures and resource consumption. Example operations, methods, apparatus, and other embodiments may thus have the additional technical effect of improving patient outcomes and reducing patient suffering compared to existing approaches.

Figure 4:
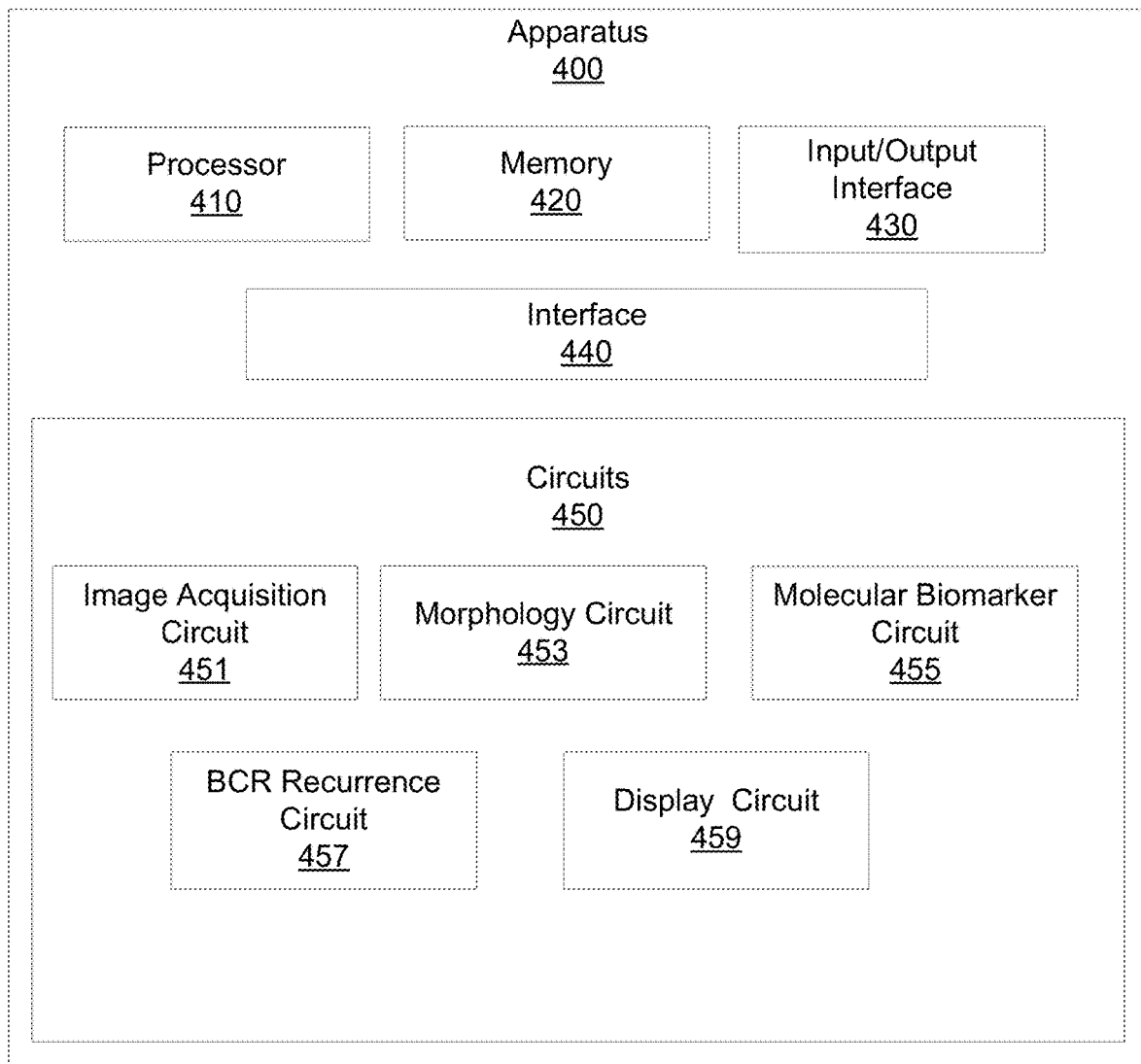
FIG. 4 illustrates an example apparatus for predicting BCR in PCa patients.

FIG. 4 illustrates an example apparatus 400 for predicting BCR in PCa patients. Apparatus 400 includes a processor 410. Apparatus 400 also includes a memory 420. Processor 410 may, in one embodiment, include circuitry such as, but not limited to, one or more single-core or multi-core processors. Processor 410 may include any combination of general-purpose processors and dedicated processors (e.g., graphics processors, application processors, etc.). The processors may be coupled with or may include memory (e.g. memory 420) or storage and may be configured to execute instructions stored in the memory 420 or storage to enable various apparatus, applications, or operating systems to perform the operations. Memory 420 is configured to store at least one digitized pathology slide of a region of tissue demonstrating PCa. The at least one digitized pathology slide has a plurality of pixels, a pixel having an intensity. In one embodiment, the at least one digitized pathology slide is a digitized image of a stained pathology slice of a region of tissue demonstrating PCa. Memory 420 may be further configured to store a training set that includes a plurality of digitized pathology slides, where a member of the plurality of digitized pathology slides includes a region of tissue demonstrating PCa, and where a first subset of the training set includes images that experienced BCR, and a second, different subset of the training set includes images that did not experience BCR. Memory 420 may be further configured to store a testing set that includes a plurality of digitized pathology slides, where a member of the plurality of digitized pathology slides includes a region of tissue demonstrating PCa, and where a first subset of the testing set includes images that experienced BCR, and a second, different subset of the testing set includes images that did not experience BCR.

Apparatus 400 also includes an input/output (I/O) interface 430, a set of circuits 450, and an interface 440 that connects the processor 410, the memory 420, the I/O interface 430, and the set of circuits 450. I/O interface 430 may be configured to transfer data between memory 420, processor 410, circuits 450, and external devices, for example, a CADx system or a personalized medicine system.

The set of circuits 450 includes an image acquisition circuit 451, a morphology circuit 453, a molecular biomarker circuit 455, a BCR recurrence classification circuit 457, and a display circuit 459.

Image acquisition circuit 451 is configured to access a first digitized pathology slide of a region of tissue demonstrating PCa. The first digitized pathology slide has a first stain channel. Image acquisition circuit 451 is also configured to access a second, different digitized pathology slide of the region of tissue. The second digitized pathology slide has a second, different stain channel. In one embodiment, accessing the first digitized pathology slide or the second digitized pathology slide may including accessing a digitized pathology slide stored in a data storage device, including a hard disk drive, a solid state device, a tape drive, accessing a digitized pathology slide over a local area network, or from the cloud. Accessing a digitized pathology slide includes acquiring electronic data, reading from a computer file, receiving a computer file, reading from a computer memory, or other computerized activity.

In one embodiment, the first digitized pathology slide is a digitized image of a first histology slice of a region of tissue demonstrating PCa. The first histology slice is an H&E stained histology slice. The first digitized pathology slide has a plurality of pixels, a pixel having an intensity. In this embodiment, the second, different digitized pathology slide is a digitized image of a second histology slice stained using 3,3-Diaminobenzidine (DAB). The second, different digitized pathology slide has a plurality of pixels, a pixel having an intensity. In another embodiments, other stain types may be employed.

Morphology circuit 453 is configured to extract a set of morphology features from the first stain channel of the first digitized pathology slide. The set of morphology features includes at least one gland lumen feature and at least one Haralick feature. Morphology circuit 453 is also configured to compute a first probability that the region of tissue will experience BCR. Morphology circuit 453 is configured to compute the first probability based, at least in part, on the first set of features. Morphology circuit 453 may be configured to compute the first probability using machine learning techniques. In one embodiment, morphology circuit 453 is configured as a machine learning classifier or deep learning classifier.

In one embodiment, morphology circuit 453 is configured to extract the set of morphology features by selecting a plurality of pixels in the first digitized pathology slide. The plurality of pixels in the first digitized pathology slide may include every pixel, every other pixel in the first digitized pathology slide, or a threshold number of pixels. Morphology circuit 453 is also configured to cluster members of the plurality of pixels in red-green-blue (RGB) space using k-means clustering, where k=4. Morphology circuit 453 is also configured to label a cluster as stroma, cytoplasm, nuclei, or lumen. Morphology circuit 453 is also configured to classify a pixel according to the cluster the pixel is nearest. In this embodiment, morphology circuit 453 is further configured to segment a boundary of a lumen cluster represented in the first digitized pathology slide.

Molecular biomarker circuit 455 is configured to extract a set of stain intensity features from the second stain channel of the second digitized pathology slide. A stain intensity feature quantifies an amount of a molecular biomarker present in a cellular nucleus represented in the second, different digitized pathology slide. In one embodiment, the molecular biomarker is $NF_{\kappa}B/p65$. Molecular biomarker circuit 455 is also configured to compute a second probability that the region of tissue will experience BCR. Molecular biomarker circuit 455 is configured to compute the second probability based, at least in part, on the set of stain intensity features. In one embodiment, the set of stain intensity features includes a percentage of cellular nuclei pixels that have a negative DAB stain optical intensity, a ratio of the number of cellular nuclei pixels having a moderately positive DAB stain optical intensity to the number of cellular nuclei pixels having a strongly positive DAB stain optical intensity, and a ratio of the number of cellular nuclei pixels having a weakly positive DAB stain optical intensity to the number of cellular nuclei pixels having a strongly positive DAB stain optical intensity. In another embodiment, the set of stain intensity features may include other, different features or combinations of features. In one embodiment, molecular biomarker circuit 455 may be configured to compute the second probability using machine learning techniques. In one embodiment, molecular biomarker circuit 455 is configured as a machine learning classifier or deep learning classifier.

BCR recurrence classification circuit 457 is configured to compute an aggregate probability that the region of tissue will experience BCR. BCR recurrence classification circuit 457 is configured to compute the aggregate probability as a function of the first probability and the second probability. In one embodiment, BCR recurrence classification circuit 457 is configured to compute the aggregate probability by multiplying the first probability with the second probability. In another embodiment, BCR recurrence classification circuit 457 is configured to compute the aggregate probability using another, different function of the first probability and the second probability. BCR recurrence classification circuit 457 is configured to compute an aggregate probability that has an accuracy of at least 0.87.

Display circuit 459 is configured to display the aggregate probability. In one embodiment, display circuit 459 is also configured to display at least one of the first digitized pathology slide, the second digitized pathology slide, the first probability, the second probability, the set of morphology features, or the set of stain intensity features. Displaying the aggregate probability may also include printing the aggregate probability.

Display circuit 459 may also control a CADx system, a monitor, or other display, to display operating parameters or characteristics of the set of circuits 450, including, including a machine learning classifier, during both training and testing, or during clinical operation of apparatus 400 or apparatus 500.

Apparatus 500 is similar to apparatus 400, but includes additional elements and details. Apparatus 500 includes personalized treatment plan circuit 551. Personalized treatment plan circuit 551 may be configured to generate a personalized treatment plan based, at least in part, on the aggregate probability, the first probability, or the second probability. In one embodiment, the personalized treatment plan is further based on the first digitized pathology slide or the second digitized pathology slide. The personalized treatment plan may suggest a surgical treatment, may define an immunotherapy agent dosage or schedule, or a chemotherapy agent dosage or schedule, when the region of tissue has a higher aggregate probability. For a region of tissue having a lower aggregate probability, other treatments, schedules, or dosages may be suggested. In this embodiment, display circuit 459 may be configured to further display the personalized treatment plan.

In one embodiment, apparatus 400 or apparatus 500 may also include a training circuit. The training circuit may be configured to train morphology circuit 453, molecular biomarker circuit 455, or BCR recurrence classification circuit 457 according to techniques described herein. Training morphology circuit 453, molecular biomarker circuit 455, or BCR recurrence classification circuit 457 may include training a machine learning classifier, including an LDA classifier or other type of machine learning or deep learning classifier. In one embodiment, the training circuit is configured to access a training dataset of digitized images of a region of interest demonstrating PCa. The training dataset includes digitized images of tissue that experienced recurrence, and digitized images of tissue that did not experience recurrence. The training dataset may include digitized images of tissue that experienced recurrence at different times, for example, images of tissue with short-term BCR, and images of tissue with long-term BCR. The training circuit may be further configured to access a testing dataset of digitized images of a region of interest demonstrating PCa, where the testing dataset includes digitized images of tissue that experienced recurrence, and digitized images of tissue demonstrating PCa that did not experience recurrence. In this embodiment, the machine learning classifier is trained and tested using the training dataset of images and the testing dataset of images respectively. Training the machine learning classifier may include training the machine learning classifier until a threshold level of accuracy is achieved, until a threshold time has been spent training the machine learning classifier, until a threshold amount of computational resources have been expended training the machine learning classifier, or until a user terminates training. Other training termination conditions may be employed.

Figure 5:
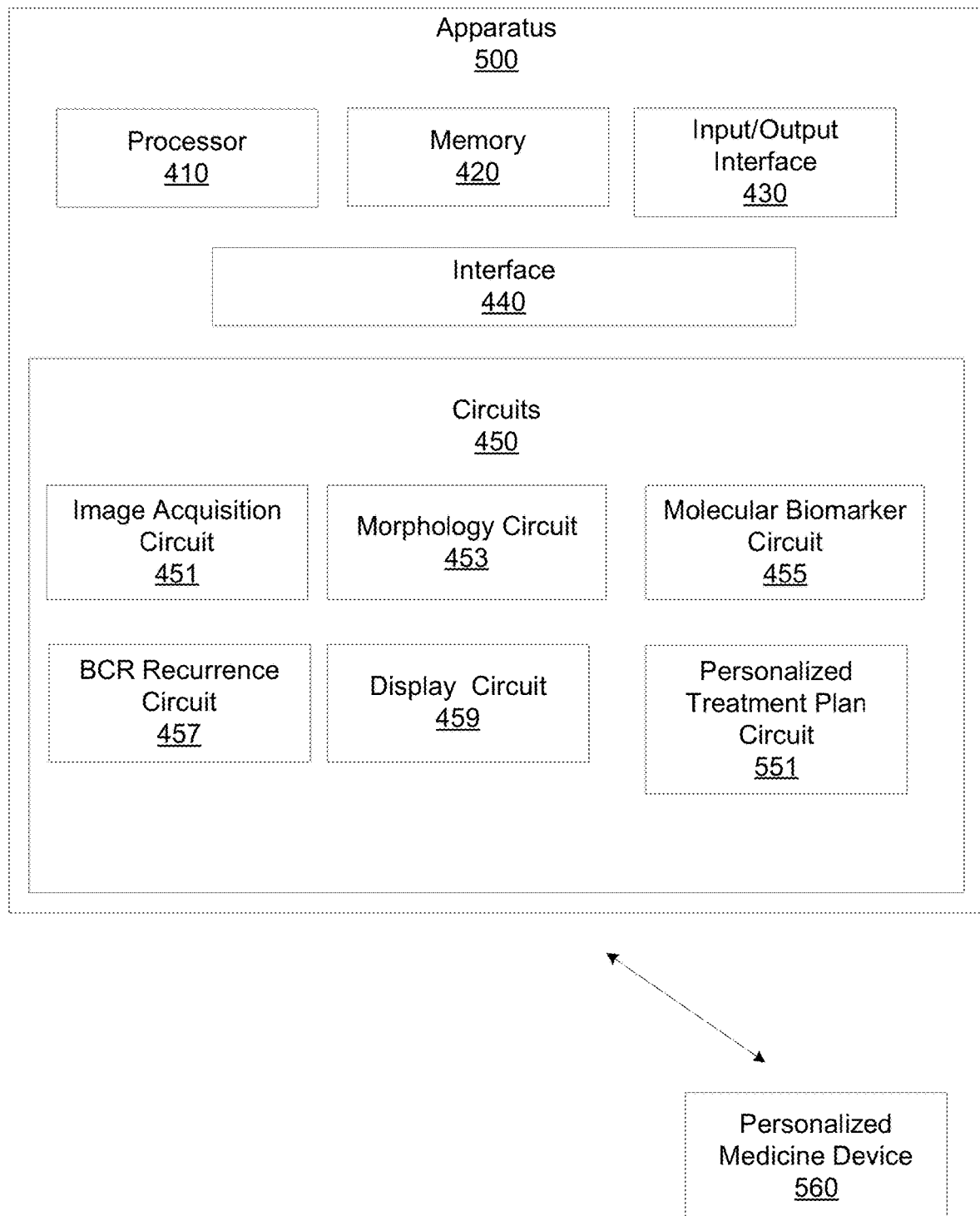
FIG. 5 illustrates an example apparatus for predicting BCR in PCa patients.

FIG. 5 further illustrates a personalized medicine device 560. Apparatus 500 may be configured to transmit at least one of the aggregate probability, the first probability, the second probability, the personalized treatment plan, the first digitized pathology slide, or the second digitized pathology slide to the personalized medicine device 560. Personalized medicine device 560 may be, for example, a CADx system, a PCa BCR recurrence prediction system, or other type of personalized medicine device that may be used to facilitate the classification of tissue or prediction of BCR. In one embodiment, apparatus 500 may control personalized medicine device 560 to display the aggregate probability, the first probability, the second probability, the personalized treatment plan, the first digitized pathology slider, or the second digitized pathology slide on a computer monitor, a smartphone display, a tablet display, or other displays.

Figure 6:
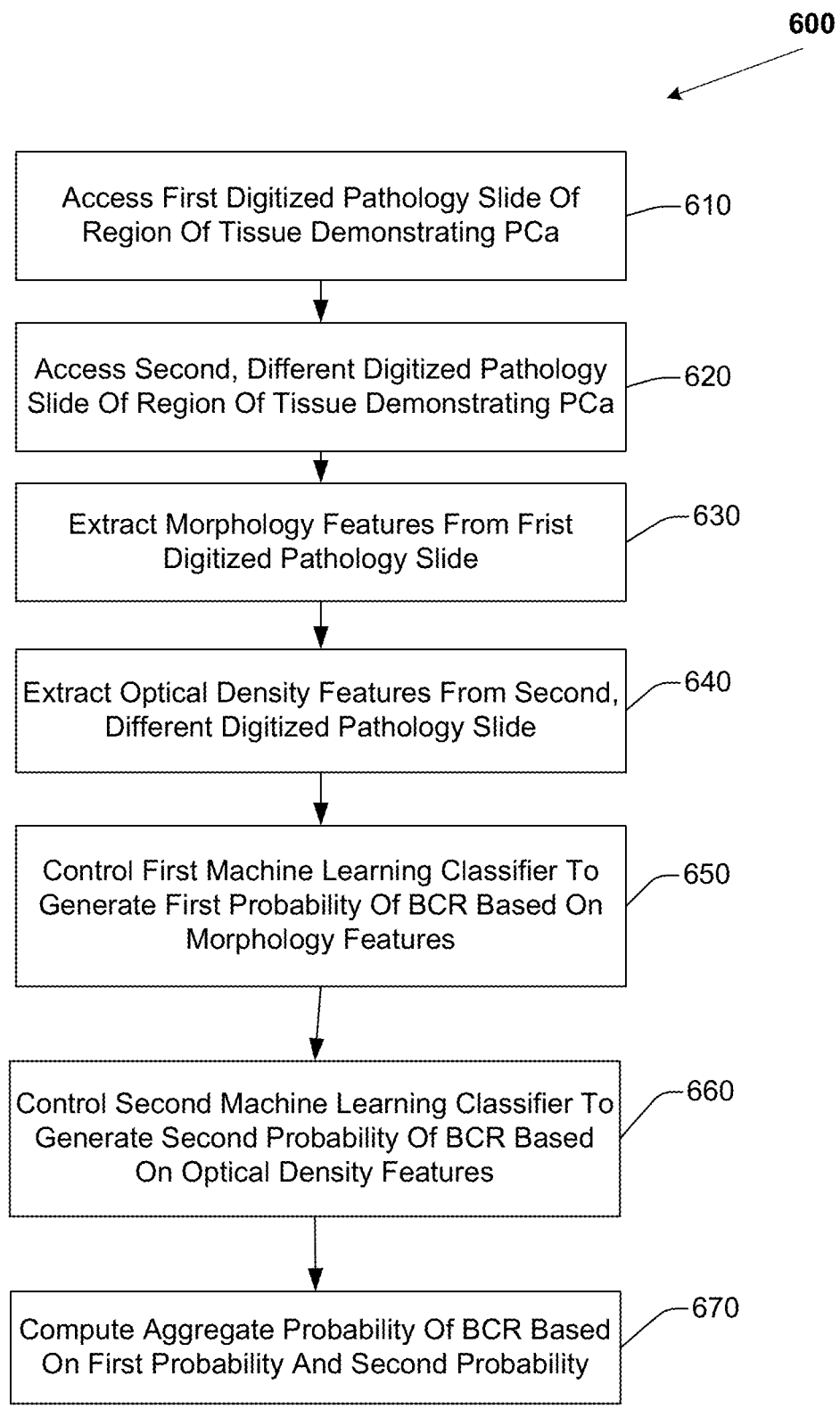
FIG. 6 illustrates an example method for predicting BCR in PCa patients.

FIG. 6 illustrates an example method 600 for predicting BCR in PCa patients. Method 600 includes, at 610 accessing a first digitized pathology slide of a region of tissue demonstrating PCa. The first digitized pathology slide has a first stain channel. The first digitized pathology slide may be a digitized image of an H&E stained pathology slide. Accessing the first digitized pathology slide includes acquiring electronic data, reading from a computer file, receiving a computer file, reading from a computer memory, or other computerized activity.

Method 600 also includes, at 620, accessing a second, different digitized pathology slide of the region of tissue. The second digitized pathology slide has a second, different stain channel. The second digitized pathology slide may be a digitized image of a histology slice stained with DAB to indicate NF-kB/p65 density. Accessing the second digitized pathology slide includes acquiring electronic data, reading from a computer file, receiving a computer file, reading from a computer memory, or other computerized activity.

Method 600 also includes, at 630, extracting a set of morphology features from the first stain channel of the first digitized pathology slide. The set of morphology features may include a Haralick feature, a global graph feature, a shape feature, a disorder feature, or a sub-graph feature.

Extracting the set of morphology features includes acquiring electronic data, reading from a computer file, receiving a computer file, reading from a computer memory, or other computerized activity.

Method 600 also includes, at 640, extracting a set of optical density features from the second, different stain channel of the second, different digitized pathology slide. An optical density feature quantifies an amount of a BCR-predictive molecular biomarker present in a cellular nucleus represented in the second, different digitized pathology slide. The set of optical density features may include a ratio of a first number of pixels having a first optical density to a second number of pixels having a second, different optical density. The set of optical density features may also include the percentage of pixels having a first or second, different optical density, as a percentage of the total number of pixels in the second digitized pathology slide. Extracting the set of optical density features includes acquiring electronic data, reading from a computer file, receiving a computer file, reading from a computer memory, or other computerized activity.

Method 600 also includes, at 650, controlling a first machine learning classifier to generate a first probability of BCR based on the set of morphology features. Controlling the first machine learning classifier includes acquiring electronic data, reading from a computer file, receiving a computer file, reading from a computer memory, or other computerized activity.

Method 600 also includes, at 660, controlling a second, different machine learning classifier to generate a second, different probability of BCR based on the set of optical density features. Controlling the second, different machine learning classifier includes acquiring electronic data, reading from a computer file, receiving a computer file, reading from a computer memory, or other computerized activity.

Method 600 also includes, at 670, computing an aggregate probability of BCR as a function of the first probability and the second, different probability. In one embodiment, computing the aggregate probability includes multiplying the first probability with the second, different probability. In another embodiment, other functions of the first probability and the second, different probability may be employed. Method 600 may further include displaying the aggregate probability, the second probability, the first probability, the morphology features, or the optical density features.

Figure 7:
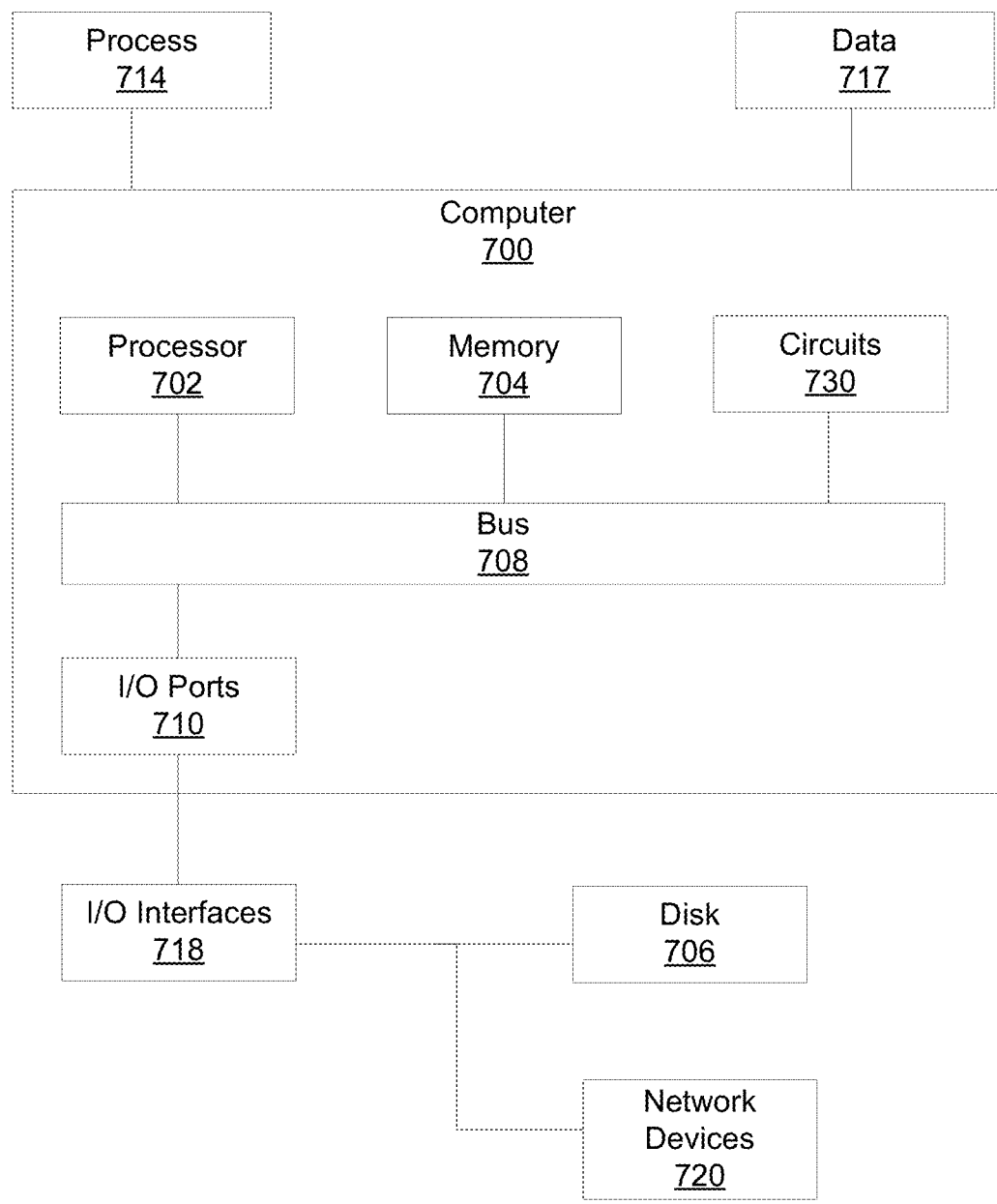
FIG. 7 illustrates an example computer in which embodiments described herein may operate.

FIG. 7 illustrates an example computer 700 in which example methods illustrated herein can operate and in which example methods, apparatus, circuits, operations, or logics may be implemented. In different examples, computer 700 may be part of a personalized medicine system, a PCa BCR prediction system, an MRI system, a digital whole slide scanner, a CT system, may be operably connectable to a PCa BCR prediction system, a CT system, an MRI system, a personalized medicine system, or a digital whole slide scanner, or may be part of a CADx system.

Computer 700 includes a processor 702, a memory 704, and input/output (I/O) ports 710 operably connected by a bus 708. In one example, computer 700 may include a set of logics or circuits 730 that perform operations for or a method of PCa BCR prediction using a machine learning classifier. Thus, the set of circuits 730, whether implemented in computer 700 as hardware, firmware, software, and/or a combination thereof may provide means (e.g., hardware, firmware, circuits) for predicting BCR in PCa. In different examples, the set of circuits 730 may be permanently and/or removably attached to computer 700.

Processor 702 can be a variety of various processors including dual microprocessor and other multi-processor architectures. Processor 702 may be configured to perform operations or steps of methods claimed and described herein. Memory 704 can include volatile memory and/or non-volatile memory. A disk 706 may be operably connected to computer 700 via, for example, an input/output interface (e.g., card, device) 718 and an input/output port 710. Disk 706 may include, but is not limited to, devices like a magnetic disk drive, a tape drive, a Zip drive, a flash memory card, or a memory stick. Furthermore, disk 706 may include optical drives like a CD-ROM or a digital video ROM drive (DVD ROM). Memory 704 can store processes 714 or data 717, for example. Data 717 may, in one embodiment, include digitized pathology slides of tissue demonstrating PCa. Disk 706 or memory 704 can store an operating system that controls and allocates resources of computer 700.

Bus 708 can be a single internal bus interconnect architecture or other bus or mesh architectures. While a single bus is illustrated, it is to be appreciated that computer 700 may communicate with various devices, circuits, logics, and peripherals using other buses that are not illustrated (e.g., PCIE, SATA, Infiniband, 794, USB, Ethernet).

Computer 700 may interact with input/output devices via I/O interfaces 718 and input/output ports 710. Input/output devices can include, but are not limited to, CT systems, MRI systems, digital whole slide scanners, an optical microscope, a keyboard, a microphone, a pointing and selection device, cameras, video cards, displays, disk 706, network devices 720, or other devices. Input/output ports 710 can include but are not limited to, serial ports, parallel ports, or USB ports.

Computer 700 may operate in a network environment and thus may be connected to network devices 720 via I/O interfaces 718 or I/O ports 710. Through the network devices 720, computer 700 may interact with a network. Through the network, computer 700 may be logically connected to remote computers. The networks with which computer 700 may interact include, but are not limited to, a local area network (LAN), a wide area network (WAN), or other networks, including the cloud.

Examples herein can include subject matter such as an apparatus, a personalized medicine system, a CADx system, a processor, a system, circuitry, a method, means for performing acts, steps, or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for predicting PCa BCR, according to embodiments and examples described.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage device", as used herein, refers to a device that stores instructions or data. "Computer-readable storage device" does not refer to propagated signals. A computer-readable storage device may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage device may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

"Circuit", as used herein, includes but is not limited to hardware, firmware, software in execution on a machine, or combinations of each to perform a function(s) or an action(s), or to cause a function or action from another logic, method, or system. A circuit may include a software controlled microprocessor, a discrete logic (e.g., ASIC), an analog circuit, a digital circuit, a programmed logic device, a memory device containing instructions, and other physical devices. A circuit may include one or more gates, combinations of gates, or other circuit components. Where multiple logical circuits are described, it may be possible to incorporate the multiple logical circuits into one physical circuit. Similarly, where a single logical circuit is described, it may be possible to distribute that single logical circuit between multiple physical circuits.

To the extent that the term "includes" or "including" is employed in the detailed description or the claims, it is intended to be inclusive in a manner similar to the term "comprising" as that term is interpreted when employed as a transitional word in a claim.

Throughout this specification and the claims that follow, unless the context requires otherwise, the words 'comprise' and 'include' and variations such as 'comprising' and 'including' will be understood to be terms of inclusion and not exclusion. For example, when such terms are used to refer to a stated integer or group of integers, such terms do not imply the exclusion of any other integer or group of integers.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A non-transitory computer-readable storage device storing instructions that when executed control a processor to perform operations for predicting biochemical recurrence (BCR) in a prostate cancer (PCa) patient, the operations comprising:

accessing a first digitized pathology slide of a region of tissue demonstrating PCa, the first digitized pathology slide having a first stain channel;

accessing a second, different digitized pathology slide of the region of tissue, the second digitized pathology slide having a second, different stain channel;

extracting a set of morphology features from the first stain channel of the first digitized pathology slide;

extracting a set of stain intensity features from the second, different stain channel of the second, different digitized pathology slide, where a stain intensity feature quantifies an amount of a molecular biomarker present in a cellular nucleus represented in the second, different digitized pathology slide;

controlling a first machine learning classifier to generate a first probability of BCR based on the set of morphology features;

controlling a second, different machine learning classifier to generate a second, different probability of BCR based on the set of stain intensity features;

computing an aggregate probability of BCR as a function of the first probability and the second, different probability; and displaying the aggregate probability.

2. The non-transitory computer-readable storage device of claim 1, where the first digitized pathology slide is a digitized image of a first histology slice of a region of tissue demonstrating PCa, where the first histology slice is a hematoxylin and eosin (H&E) stained histology slice, where the first digitized pathology slide has a plurality of pixels, a pixel having an intensity.

3. The non-transitory computer-readable storage device of claim 2, where extracting the set of morphology features from the first stain channel of the first digitized pathology slide includes:

selecting a plurality of pixels in the first digitized pathology slide;

clustering members of the plurality of pixels in red-green-blue (RGB) space using k-means clustering, where k=4;

labeling a cluster as stroma, cytoplasm, nuclei, or lumen;

classifying a pixel according to the cluster the pixel is nearest; and segmenting a boundary of a lumen cluster.

4. The non-transitory computer-readable storage device of claim 3, where the set of morphology features includes a gland orientation disorder average range feature, a gland orientation disorder information measure 2 feature, and a gland orientation disorder energy range feature.

5. The non-transitory computer-readable storage device of claim 3, where the set of morphology features includes at least one gland lumen feature and at least one Haralick feature.

6. The non-transitory computer-readable storage device of claim 5, where the at least one gland lumen features includes a global graph feature, a shape feature, a disorder feature, or a sub-graph feature, and where the at least one Haralick feature includes a pixel intensity contrast feature, an energy feature, or an entropy feature.

7. The non-transitory computer-readable storage device of claim 1, where the molecular biomarker is $NF_{\kappa}B/p65$.

8. The non-transitory computer-readable storage device of claim 7, where the second, different digitized pathology slide is a digitized image of a second histology slice stained using 3,3-Diaminobenzidine (DAB), where the second, different digitized pathology slide has a plurality of pixels, a pixel having an intensity.

9. The non-transitory computer-readable storage device of claim 8, where extracting the set of stain intensity features includes:
  segmenting a cellular nucleus represented in the second different digitized pathology slide; and
  computing an optical density of the DAB stain in a pixel of a segmented cellular nucleus.

10. The non-transitory computer-readable storage device of claim 9, where the set of stain intensity features includes:
  a percentage of cellular nuclei pixels that have a negative DAB stain optical intensity,
  a ratio of a number of cellular nuclei pixels having a moderately positive DAB stain optical intensity to a number of cellular nuclei pixels having a strongly positive DAB stain optical intensity, and
  a ratio of a number of cellular nuclei pixels having a weakly positive DAB stain optical intensity to the number of cellular nuclei pixels having a strongly positive DAB stain optical intensity.

11. The non-transitory computer-readable storage device of claim 9, where segmenting the cellular nucleus represented in the second different digitized pathology slide includes segmenting the cellular nucleus using a deep learning segmentation approach that employs a 65 pixel by 65 pixel patch.

12. The non-transitory computer-readable storage device of claim 1, where the first probability of BCR ranges from 0 to 1, where the first probability represents a likelihood that the patient will experience early BCR, and
  where the second probability of BCR ranges from 0 to 1, where the second probability represents the likelihood that the patient will experience early BCR.

13. The non-transitory computer-readable storage device of claim 1, where the aggregate probability predicts BCR with an accuracy of at least 0.87.

14. The non-transitory computer-readable storage device of claim 1, the operations further comprising generating a personalized cancer treatment plan based, at least in part, on the aggregate probability.

15. An apparatus for predicting biochemical recurrence (BCR) in prostate cancer (PCa) patients, the apparatus comprising:
  a processor;
  a memory configured to store at least one digitized pathology slide of a region of tissue demonstrating PCa;
  an input/output (I/O) interface;
  a set of circuits; and
  an interface that connects the processor, the memory, the I/O interface, and the set of circuits, the set of circuits comprising:
  an image acquisition circuit configured to:
    access a first digitized pathology slide of a region of tissue demonstrating PCa, the first digitized pathology slide having a first stain channel, and
    access a second, different digitized pathology slide of the region of tissue, the second digitized pathology slide having a second, different stain channel;
  a morphology feature extraction circuit configured to:
    extract a set of morphology features from the first stain channel of the first digitized pathology slide, where the set of morphology features includes at least one gland lumen feature and at least one Haralick feature, and
    compute a first probability that the region of tissue will experience BCR based, at least in part, on the set of morphology features;
  a molecular biomarker feature extraction circuit configured to:
    extract a set of stain intensity features from the second stain channel of the second digitized pathology slide, where a stain intensity feature quantifies an amount of a molecular biomarker present in a cellular nucleus represented in the second, different digitized pathology slide, where the molecular biomarker is $NF_{-K}B/p65$, and
    compute a second probability that the region of tissue will experience BCR based, at least in part, on the set of stain intensity features;
  a BCR recurrence classification circuit configured to compute an aggregate probability that the region of tissue will experience BCR as a function of the first probability and the second probability; and
  a display circuit configured to display the aggregate probability and at least one of the first digitized pathology slide, the second digitized pathology slide, the first probability, the second probability, the set of morphology features, or the set of stain intensity features.

16. The apparatus of claim 15, where:
  the first digitized pathology slide is a digitized image of a first histology slice of a region of tissue demonstrating PCa, where the first histology slice is a hematoxylin and eosin (H&E) stained histology slice, where the first digitized pathology slide has a plurality of pixels, a pixel having an intensity; and
  where the second, different digitized pathology slide is a digitized image of a second histology slice stained using 3,3-Diaminobenzidine (DAB), where the second, different digitized pathology slide has a plurality of pixels, a pixel having an intensity.

17. The apparatus of claim 16, where the morphology circuit is configured to extract the set of morphology features by:
  selecting a plurality of pixels in the first digitized pathology slide;
  clustering members of the plurality of pixels in red-green-blue (RGB) space using k-means clustering, where k=4;
  labeling a cluster as stroma, cytoplasm, nuclei, or lumen;
  classifying a pixel according to the cluster the pixel is nearest; and
  segmenting a boundary of a lumen cluster.

18. The apparatus of claim 16, where the set of stain intensity features includes:
  a percentage of cellular nuclei pixels that have a negative DAB stain optical intensity,
  a ratio of the number of cellular nuclei pixels having a moderately positive DAB stain optical intensity to the number of cellular nuclei pixels having a strongly positive DAB stain optical intensity, and
  a ratio of the number of cellular nuclei pixels having a weakly positive DAB stain optical intensity to the number of cellular nuclei pixels having a strongly positive DAB stain optical intensity.

19. The apparatus of claim 15, further comprising a personalized treatment plan circuit configured to generate a personalized treatment plan based, at least in part, on the aggregate probability.

20. A method for predicting biochemical recurrence (BCR) in prostate cancer (PCa) patients, the method comprising:
  accessing a first digitized pathology slide of a region of tissue demonstrating PCa, the first digitized pathology slide having a first stain channel;

accessing a second, different digitized pathology slide of the region of tissue, the second digitized pathology slide having a second, different stain channel;

extracting a set of morphology features from the first stain channel of the first digitized pathology slide;

extracting a set of optical density features from the second, different stain channel of the second, different digitized pathology slide, where an optical density feature quantifies an amount of a BCR-predictive molecular biomarker present in a cellular nucleus represented in the second, different digitized pathology slide;

controlling a first machine learning classifier to generate a first probability of BCR based on the set of morphology features;

controlling a second, different machine learning classifier to generate a second, different probability of BCR based on the set of optical density features; and computing an aggregate probability of BCR as a function of the first probability and the second, different probability.

* * * * *